United States Patent
Gude et al.

[19]

[11] Patent Number: 6,028,889

[45] Date of Patent: Feb. 22, 2000

[54] PIPELINED FAST HADAMARD TRANSFORM

[75] Inventors: Jorge Marino Gude, Staten Island, N.Y.; Guangying Li, Bell Mead, N.J.; Carol Conti Moy, Morristown, N.J.; John W. Niemasz, Jr., Fredon, N.J.

[73] Assignee: Lucent Technologies, Inc., Murray Hill, N.J.

[21] Appl. No.: 09/030,553

[22] Filed: Feb. 25, 1998

[51] Int. Cl.[7] ...................................................... H04B 15/00
[52] U.S. Cl. ........................ 375/209; 375/208; 375/343; 375/346; 370/209; 704/204; 708/410
[58] Field of Search ................................. 375/340, 346, 375/285, 208, 209, 200; 370/203, 208, 209; 704/3, 204, 203, 217, 216; 708/5, 3, 161, 160, 204, 233, 406, 410, 813

[56] References Cited

U.S. PATENT DOCUMENTS

| | | | |
|---|---|---|---|
| 3,792,355 | 2/1974 | Miyata et al. | 325/42 |
| 3,956,619 | 5/1976 | Mundy et al. | 235/156 |
| 4,209,751 | 6/1980 | Sakamoto | 455/186 |
| 5,357,454 | 10/1994 | Dent | 364/727 |
| 5,561,618 | 10/1996 | Dehesh | 364/725 |
| 5,574,675 | 11/1996 | Lin | 364/727 |
| 5,856,935 | 1/1999 | Moy et al. | 364/727.01 |

*Primary Examiner*—Amanda T. Le
*Assistant Examiner*—Dac V. Ha

[57] ABSTRACT

A pipelined Fast Hadamard Transform ("FHT") architecture is disclosed that comprises $\log_2 N$ identical pipeline stages, which are ideally suited for implementation in application-specific integrated circuits. One 2-port stage of the first illustrative embodiment of the present invention advantageously comprises: a first input for sequentially receiving N incoming correlation signals, I(i), at cycle i, wherein the N incoming correlation signals are based on N Walsh chips; a processor for generating N outgoing correlation signals based on the N incoming correlation signals, I(i); and a first output for sequentially outputting the N outgoing correlation signals, O(i); wherein $$O(i) = \begin{cases} I(k - k\bmod N + 2k\bmod N) + I(k - k\bmod N + 2k\bmod N + 1) \\ \qquad i\bmod N \geq N/2 \\ I(k - k\bmod N + 2k\bmod N) - I(k - k\bmod N + 2k\bmod N + 1) \\ \qquad i\bmod N < N/2 \end{cases}, \text{ and}$$

$k=(i-N/2)$.

7 Claims, 4 Drawing Sheets

PIPELINED FAST HADAMARD TRANSFORM

FIELD OF THE INVENTION

The present invention relates to telecommunications in general, and, more particularly, to techniques for detecting and correcting bit errors caused by noise, interference, and distortion in a telecommunications channel.

BACKGROUND OF THE INVENTION

Figure 1:
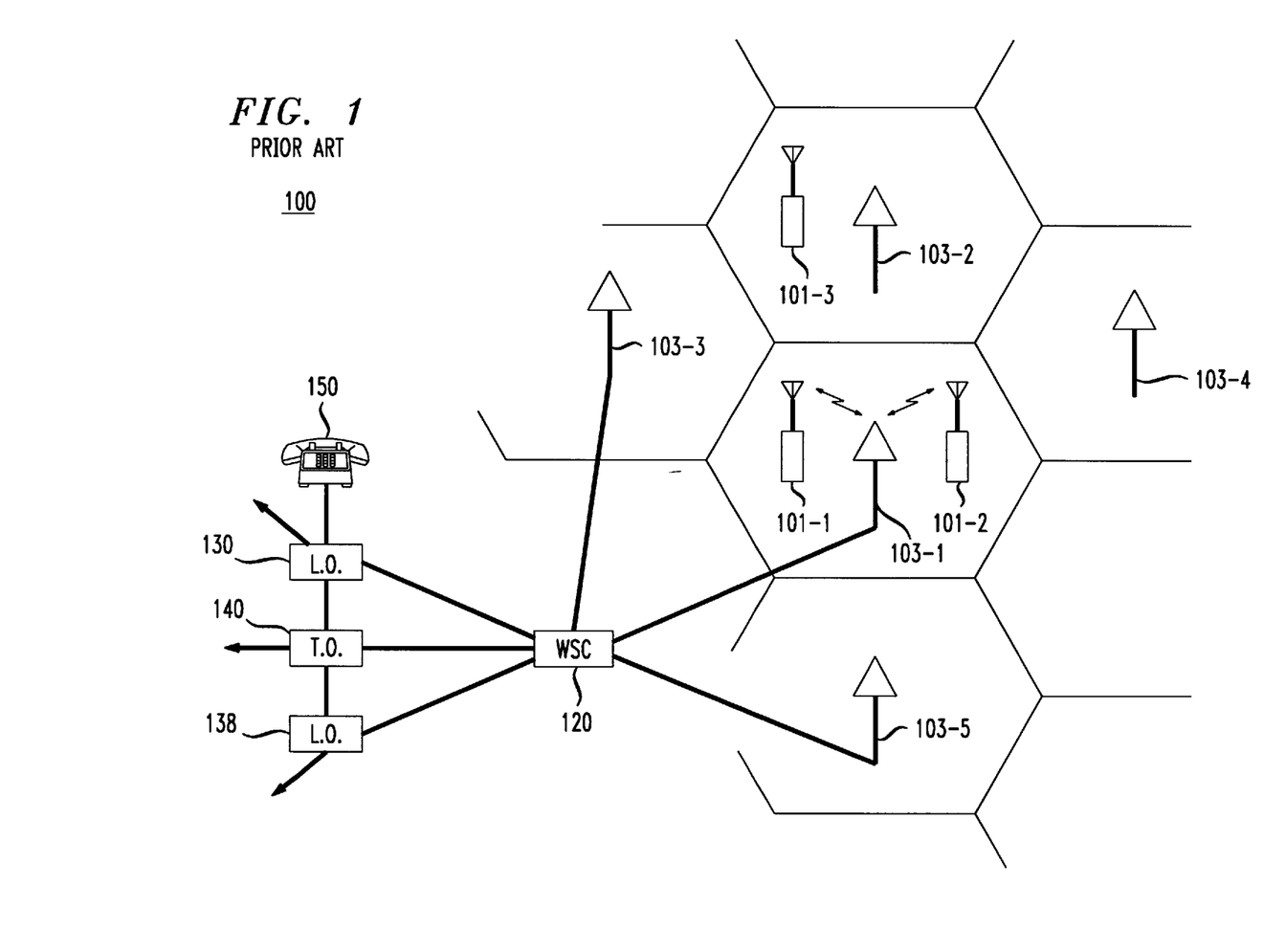
FIG. 1 depicts a schematic diagram of a wireless telecommunications system in the prior art.

FIG. 1 depicts a schematic diagram of a portion of a typical wireless telecommunications system, which provides wireless telecommunications service to a number of wireless terminals (e.g., wireless terminals 101-1 through 101-3) that are situated within a geographic region. The heart of wireless telecommunications system 100 is Wireless Switching Center ("WSC") 120, which might also be known as a Mobile Switching Center ("MSC") or Mobile Telephone Switching Office ("MTSO"). Typically, Wireless Switching Center 120 is connected to a plurality of base stations (e.g., base stations 103-1 through 103-5) that are dispersed throughout the geographic area serviced by the system and to the local and long-distance telephone offices (e.g., local-office 130, local-office 138 and toll-office 140). Wireless Switching Center 120 is responsible for, among other things, establishing and maintaining calls between wireless terminals and between a wireless terminal and a wireline terminal (e.g., wireline terminal 150), which wireline terminal is connected to Wireless Switching Center 120 via the local and/or long-distance networks.

The geographic area serviced by a wireless telecommunications system is divided into spatially distinct areas called "cells." As depicted in FIG. 1, each cell is schematically represented by one hexagon in a honeycomb pattern; in practice, however, each cell has an irregular shape that depends on the topography of the terrain surrounding the cell. Typically, each cell contains a base station, which comprises the radios and antennas that the base station uses to communicate with the wireless terminals in that cell and also comprises the transmission equipment that the base station uses to communicate with Wireless Switching Center 120.

For example, when wireless terminal 101-1 desires to communicate with wireless terminal 101-2, wireless terminal 101-1 transmits the desired information to base station 103-1, which relays the information to Wireless Switching Center 120. Upon receipt of the information, and with the knowledge that it is intended for wireless terminal 101-2, Wireless Switching Center 120 then returns the information back to base station 103-1, which relays the information, via radio, to wireless terminal 101-2.

When digital signals are transmitted between a base station and a wireless terminal, the signals can be corrupted during transmission by noise, interference, and distortion. For example, noise can cause a radio receiver to occasionally misinterpret a received binary digit as a "0," when it was transmitted as a "1," and to occasionally misinterpret a received binary digit as a "1," when it was transmitted as a "0." Therefore, digital wireless telecommunications systems often incorporate an error detection and correction mechanism to mitigate the effects of corrupt transmissions.

Although separate error detection and correction mechanisms are provided for transmissions from a wireless terminal to a base station (the "uplink") and for transmissions from the base station to the wireless terminal (the "downlink"), the mechanisms can be identical. So for pedagogical purposes, the details of the error detection and correction mechanism for only one line, the uplink, will be discussed in this background.

Figure 2:
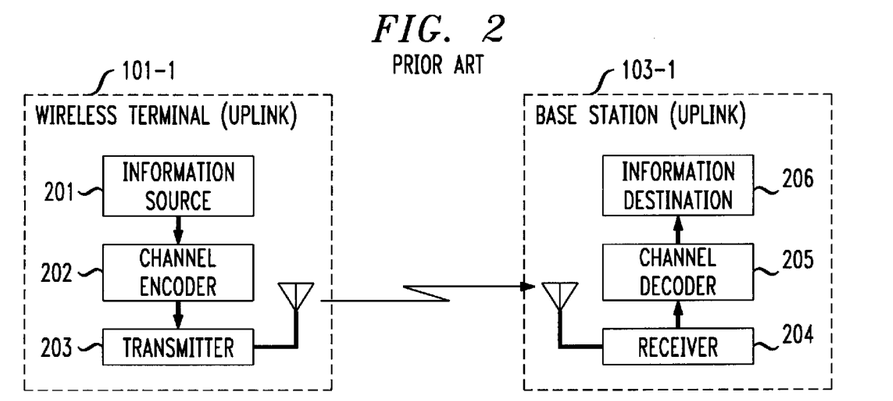
FIG. 2 depicts a block diagram of the salient components in the uplink channel from wireless terminal 101-1 to base station 103-1, with emphasis on the error detection and correction mechanism in the uplink channel.

FIG. 2 depicts a block diagram of the salient components of wireless terminal 101-1 and base station 103-1 in the prior art that support an error detection and correction mechanism for uplink transmissions. Wireless terminal 101-1 comprises: information source 201, channel encoder 202, and transmitter 203, and base station 103-1 comprises: receiver 204, channel decoder 205, and information destination 206.

Information source 201 is the source of a digital message signal (e.g., digitized voice, control signals, etc.) that is to be transmitted via radio to base station 103-1. The output of information source 201 is fed to channel encoder 202.

Channel encoder 202 is the mechanism that wireless terminal 101-1 employs to provide error detection and correction for uplink transmissions. Channel encoder 202 typically partitions the digital message signal into fixed-length blocks and substitutes in the place of each block a codeword that is transmitted in place of the block. Typically, the codeword is uniquely associated with the fixed-length block and the codeword is selected from a set of error correcting codewords that are constructed in such a way as to be distinguishable even if corrupted during transmission.

In accordance with a given set of error correcting codes, channel encoder 202 substitutes each n-bit block of the digital message signal with a m-bit codeword that is uniquely associated with the n-bit block (where m>n). Where the number of symbols or bits in the codeword is an integral multiple of the number of symbols or bits in the block, the symbols in the codeword are sometimes called "chips" rather than "bits," but in either case the mechanism is the same.

For example, in accordance with one error correcting code set in the prior art, the 7-4 Hamming Code, each 4-bit block of digital message signal is replaced with a 7-bit codeword that is transmitted in place of the 4-bit block. Table 1 depicts the mapping of the 4-bit blocks to 7-bit codewords in accordance with the 7-4 Hamming Code.

TABLE 1

The Hamming (7-4) Code

| codeword index | 4-bit block | 7-bit codeword |
| --- | --- | --- |
| 0 | 0000 | 0000000 |
| 1 | 0001 | 0001111 |
| 2 | 0010 | 0010110 |
| 3 | 0011 | 0011001 |
| 4 | 0100 | 0100101 |
| 5 | 0101 | 0101010 |
| 6 | 0110 | 0110011 |
| 7 | 0111 | 0111100 |
| 8 | 1000 | 1000011 |
| 9 | 1001 | 1001100 |
| 10 | 1010 | 1010101 |
| 11 | 1011 | 1011010 |
| 12 | 1100 | 1100110 |
| 13 | 1101 | 1101001 |
| 14 | 1110 | 1110000 |
| 15 | 1111 | 1111111 |

Channel encoder 202 then feeds each codeword, in succession, to transmitter 203, which modulates the codeword onto a carrier and transmits it to receiver 204 in base station 103-1.

Receiver 204 demodulates the incoming carrier signal and provides the (potentially corrupt) codeword to channel decoder 205 for decoding.

Channel decoder 205 is the mechanism that base station 103-1 employs to provide error detection and correction for uplink transmissions. Channel decoder 205 receives the codeword and attempts to correlate it to one of the codewords in the error correcting code set. If there is an identical match, which suggests that the codeword is not corrupt, channel decoder 205 outputs the n-bit block corresponding to the codeword. If there is no identical match, which indicates that the codeword is corrupt, channel decoder 205 attempts to correlate the corrupt codeword to the most similar codeword in the error correcting code set. When channel decoder 205 has correlated the corrupt codeword to a legitimate codeword, channel decoder 205 outputs the n-bit block corresponding to the legitimate codeword most similar to the corrupt codeword.

If (1) the error correcting code set and (2) the mechanism for correlating corrupt codewords with legitimate codewords is well constructed, an error detection and correction mechanism can all but eliminate the effects of noise, interference, and distortion on the transmission channel.

An error correction and detection mechanism in the prior art that is especially well-suited for use with code-division multiple access ("CDMA") uses an error correcting code set based on Walsh Codes. See, for example, Gilhousen et. al., "On the Capacity of a Cellular CDMA System," IEEE Trans. on Vehicular Technology, Vol. 40, pp. 303–312 (May 1991). Furthermore, U.S. Pat. Nos. 3,701,143 and 3,795,864 teach how to make and use Walsh codes for error detection and correction and are incorporated by reference as if set forth in their entirety.

In accordance with this mechanism, channel decoder 202 substitutes each n-bit block of digital message signal with a $2^n$-chip bipolar codeword. Because the Walsh codes are advantageously transmitted using direct-sequence spread-spectrum modulation, each symbol in a Walsh code is represented in bipolar format, whose symbols comprises "-1" and "+1,"in contrast to the symbols "0" and "1." For example, Table 2 depicts a mapping of 3-bit blocks to 8-chip Walsh codes.

TABLE 2

| codeword index | 3-bit block | 8-chip Walsh codeword |
|---|---|---|
| 0 | 000 | +1, +1, +1, +1, +1, +1, +1, +1 |
| 1 | 001 | +1, -1, +1, -1, +1, -1, +1, -1 |
| 2 | 010 | +1, +1, -1, -1, +1, +1, -1, -1 |
| 3 | 011 | +1, -1, -1, +1, +1, -1, -1, +1 |
| 4 | 100 | +1, +1, +1, +1, -1, -1, -1, -1 |
| 5 | 101 | +1, -1, +1, -1, -1, +1, -1, +1 |
| 6 | 110 | +1, +1, -1, -1, -1, -1, +1, +1 |
| 7 | 111 | +1, -1, -1, +1, -1, +1, +1, -1 |

For example, if channel encoder 202 encodes the 3-bit block "000" as:

TABLE 3

| chip 1 | chip 2 | chip 3 | chip 4 | chip 5 | chip 6 | chip 7 | chip 8 |
|---|---|---|---|---|---|---|---|
| +1 | +1 | +1 | +1 | +1 | +1 | +1 | +1 | corruption in transmission can cause receiver 204 to receive and output to channel decoder 205 the corrupt codeword

TABLE 4

| chip 1 | chip 2 | chip 3 | chip 4 | chip 5 | chip 6 | chip 7 | chip 8 |
|---|---|---|---|---|---|---|---|
| +0.92 | +1.04 | +0.34 | +0.56 | -0.23 | +0.35 | +0.87 | +0.71 |

One technique that channel decoder 205 can use to correlate corrupt Walsh Code codewords to legitimate codewords involves the well-known Fast Hadamard Transform. U.S. Pat. Nos. 3,859,515, 3,742,201, 3,792,355, 3,956,619 and 5,357,454, which are incorporated by reference as if set forth in their entirety, teach how to make the Fast Hadamard Transform and how to use it to correlate corrupt Walsh Code codewords to legitimate Walsh Code codewords.

The Fast Hadamard Transform accepts as input a received $2^n$-chip Walsh codeword, such as that in Table 4, and outputs $2^n$ correlation signals, such as that in Table 5. Each correlation signal indicates the likelihood that the received corrupt codeword is one of the legitimate codewords. For example, a Fast Hadamard Transform performed on the corrupt codeword in Table 4 yields the correlation signals in Table 5.

TABLE 5

| Codeword Index | Correlation Coefficient Signal |
|---|---|
| 1 | 4.96 |
| 2 | 1.56 |
| 3 | 2.12 |
| 4 | -0.80 |
| 5 | -0.24 |
| 6 | 1.24 |
| 7 | -0.32 |
| 8 | -1.16 |

From Table 5, it can be seen that the correlation signal for codeword #1 is greater than that for any other codeword, and, therefore, the Fast Hadamard Transform suggests that the Walsh Code associated with codeword #1 is the most likely to have been transmitted. On that basis, channel decoder 205 outputs the 3-bit block associated with codeword #1, which from Table 2 is "000."

Although many techniques for implementing the Fast Hadamard Transform are well-known in the prior art, those techniques are generally too slow or require too much hardware for implementation in contemporary radio receivers. Therefore, the need exists for a technique that is fast, compact, and well-suited for implementation in application-specific integrated circuits.

SUMMARY OF THE INVENTION

The present invention is a technique for performing the Fast Hadamard Transform without some of the costs and restrictions associated with techniques in the prior art. In particular, embodiments of the present invention utilize a highly-efficient pipeline architecture that is capable of performing the Fast Hadamard Transform on N Walsh chips in real-time utilizing only N $\log_2 N$ additions and subtractions. Furthermore, some embodiments of the present invention utilize $\log_2 N$ identical pipeline stages, which are ideally suited for implementation in application-specific integrated circuits or as components in a field-programmable gate-array. And still furthermore, some embodiments of the present invention utilize $\log_2 N$ pipeline stages such that each stage requires only one-half of the memory of the earlier stage in the pipeline. These last embodiments are particularly well-suited for applications in which the number of gates in the embodiment must be kept low.

Three illustrative embodiments of the present invention are described in detail. The first illustrative embodiment comprises $\log_2 N$ 2-port stages that accept one input and output one result per pipeline cycle. The second illustrative embodiment has a shorter pipeline latency than the first illustrative embodiment and comprises $\log_2 N$ 4-port stages that accept two inputs and outputs two results per pipeline cycle. The third illustrative embodiment requires less memory than the second illustrative embodiment and also comprises $\log_2 N$ 4-port stages.

A 2-port stage of the first illustrative embodiment of the present invention advantageously comprises: a first input for sequentially receiving N incoming correlation signals, I(i), at cycle i, wherein the N incoming correlation signals are based on N Walsh chips; a processor for generating N outgoing correlation signals based on the N incoming correlation signals, I(i); and a first output for sequentially outputting the N outgoing correlation signals, O(i); wherein $$O(i) = \begin{cases} I(k-k\bmod N + 2k\bmod N) + I(k-k\bmod N + 2k\bmod N + 1) \\ \quad i\bmod N \geq N/2 \\ I(k-k\bmod N + 2k\bmod N) - I(k-k\bmod N + 2k\bmod N + 1) \\ \quad i\bmod N < N/2 \end{cases}, \text{ and}$$

k=(i-N/2).

DETAILED DESCRIPTION

Figure 3:
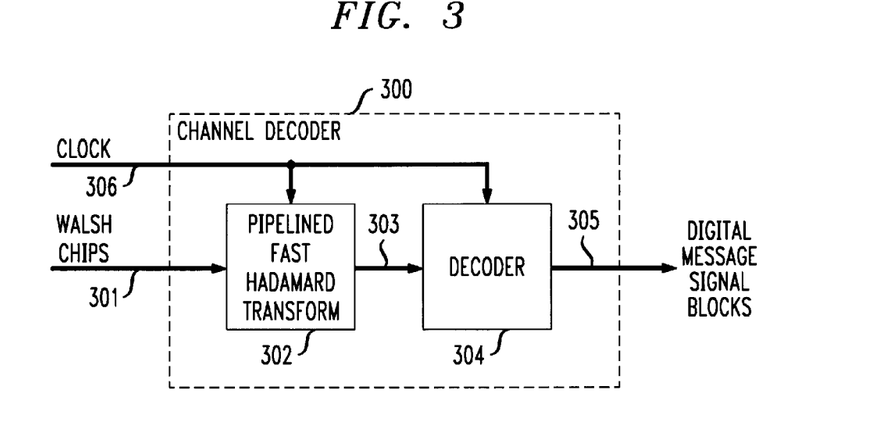
FIG. 3 depicts a block diagram of a channel decoder in accordance with the illustrative embodiment of the present invention.

FIG. 3 depicts a block diagram of channel decoder 300 in accordance with the illustrative embodiment of the present invention. Channel decoder 300 advantageously accepts a $2^n$-chip (potentially corrupt) Walsh codeword that is received by a radio receiver (not shown), and outputs an n-bit digital message signal block that is associated with the legitimate Walsh codeword that is most closely correlated with the received codeword. Each chip is advantageously represented by a real number, in well-known fashion.

Channel decoder 300 advantageously comprises: Pipelined Fast Hadamard Transform 302 and decoder 304, interconnected as shown.

Pipelined Fast Hadamard Transform 302 advantageously: (1) accepts a $2^n$-chip (potentially corrupt) Walsh codeword, (2) performs a Fast Hadamard Transform on the chips, and (3) outputs $2^n$ correlation signals to decoder 304. The details of Pipelined Fast Hadamard Transform 302 will be discussed below.

Decoder 304 advantageously: (1) accepts the $2^n$ correlation signals, (2) determines which Walsh Code codeword has the highest correlation, and (3) outputs the n-bit digital message signal block associated with that codeword, all in well-known fashion. It will be clear to those skilled in the art how to make and use decoder 304.

Because Pipelined Fast Hadamard Transform 302 has a pipelined architecture, a clock signal on lead 306 indicates the pipeline cycle, i, and synchronizes the operation of Pipelined Fast Hadamard Transform 302 and decoder 302. Furthermore, the pipelined architecture of the illustrative embodiments enables Pipelined Fast Hadamard Transform 302 to begin processing before all $2^n$-chips of a codeword are received by channel decoder 300.

In the first illustrative embodiment described below, Pipelined Fast Hadamard Transform 302 accepts one Walsh chip per pipeline cycle and outputs one correlation signal to decoder 304 per pipeline cycle.

In contrast, in the second and third illustrative embodiments, Pipelined Fast Hadamard Transform 302 accepts two Walsh chips per pipeline cycle and output two correlation signals to decoder 304 per pipeline cycle. From the three illustrative embodiments, it will be clear to those skilled in the art how to make and use other embodiments of the present invention that accept c Walsh chips per pipeline cycle and output c correlation signals to decoder 304 per pipeline cycle, where $c \leq N/2$, c is an integral power of 2, and $N=2^n$.

Furthermore, as soon as the last chip in one codeword has been input into Pipelined Fast Hadamard Transform 302, the first chip in the next codeword can be input, without having to flush the pipeline. Similarly, the first correlation signal associated with the second codeword is output immediately after the last correlation signal associated with the first codeword is output.

Figure 4:
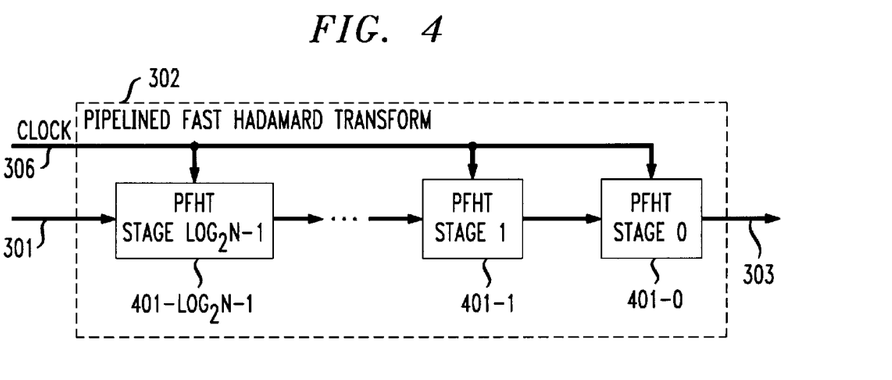
FIG. 4 depicts a block diagram of a Pipelined Fast Hadamard Transform in accordance with a first illustrative embodiment of the present invention.

FIG. 4 depicts a block diagram of the first illustrative embodiment of Pipelined Fast Hadamard Transform (PFHT) 302, which advantageously comprises $\log_2 N$ identical, cascaded stages, numbered PFHT stage 401-$\log_2 N$-1 through PFHT stage 401-0. For the purposes of this specification, the stages are numbered beginning with the last stage in the pipeline towards the first stage so as to make each stage's transfer function easier to understand. It will, however, be clear to those skilled in the art that this numbering convention is arbitrary, and that other numbering conventions can be adopted. Advantageously the stages are cascaded so that the input of stage j is the output of stage j+1, for j=0 to $\log_2 N$-1. Advantageously, all of the stages are synchronized with the clock signal on lead 306, which is indicative of the pipeline clock cycle, i.

Figure 5:
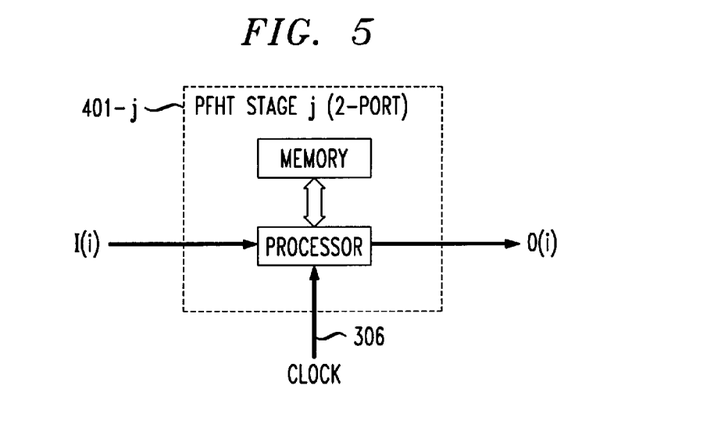
FIG. 5 depicts a block diagram of a 2-port Pipelined Fast Hadamard Transform stage in accordance with the first illustrative embodiment.

FIG. 5 depicts a block diagram of stage 401-*j*, which accepts one input signal and outputs one output signal per pipeline cycle. If stage 401-*j* is the first stage, the input is Walsh chips. If stage 401-*j* is not the first stage, the input is intermediate correlation signals that are based on the Walsh chips fed into the first stage. If stage 401-*j* is the last stage, the output is the final correlation signals for decoder 304, and if stage 401-*j* is not the last stage, the output is an intermediate correlation signal destined for the next stage.

Stage 401-*j* advantageously comprises a hard-wired special-purpose processor for generating the output O(i) based on the input I(i), and a memory to store the respective signals pending their use and output. When one $2^n$-chip Walsh codeword is input to stage 401-$j$ in $N=2^n$ pipeline cycles (beginning at pipeline cycle i mod N=0), the output O(i) is related to the input I(i) by the transfer function:

$$O(i) = \begin{cases} I(k - k\bmod N + 2k\bmod N) + I(k - k\bmod N + 2k\bmod N + 1) & i\bmod N \geq N/2 \\ I(k - k\bmod N + 2k\bmod N) - I(k - k\bmod N + 2k\bmod N + 1) & i\bmod N < N/2 \end{cases} \quad \text{(Eq. 1)}$$

wherein i is a non-negative integer indicative of the pipeline cycle and k=(i-N/2). It will be clear to those skilled in the art that values of k<0 are undefined.

For example, Table 6 illustrates the relationship of i, I(i) and O(i) for N=8 for PFHT stage j according to Eq. 1.

TABLE 6

| i | i mod N | I(i) | O(i) |
|---|---------|------|------|
| 0 | 0 | I(0) | |
| 1 | 1 | I(1) | |
| 2 | 2 | I(2) | |
| 3 | 3 | I(3) | |
| 4 | 4 | I(4) | I(0) + I(1) |
| 5 | 5 | I(5) | I(2) + I(3) |
| 6 | 6 | I(6) | I(4) + I(5) |
| 7 | 7 | I(7) | I(6) + I(7) |
| 8 | 0 | | I(0) − I(1) |
| 9 | 1 | | I(2) − I(3) |
| 10 | 2 | | I(4) − I(5) |
| 11 | 3 | | I(6) − I(7) |

At i=7, the 8 input signals (i.e., the 8 Walsh chips for the first stage and the 8 intermediate correlation signals for the later stages) associated with one codeword have all been input to the stage, and, therefore, at i=8, the first of another 8 input signals can be input to the stage. Note, that the first output signal emerges from the stage i mod N/2 cycles after the first input signal is fed into the stage. Table 7 shows how, in pipeline fashion, one set of 8 input signals (input from i=0 to 7 and output from i=4 to 11) is followed immediately by a second set of 8 signals (input from i=8 to 15 and output from i=12 to 19).

TABLE 7

| i | i mod N | I(i) | O(i) |
|---|---------|------|------|
| 0 | 0 | I(0) | |
| 1 | 1 | I(1) | |
| 2 | 2 | I(2) | |
| 3 | 3 | I(3) | |
| 4 | 4 | I(4) | I(0) + I(1) |
| 5 | 5 | I(5) | I(2) + I(3) |
| 6 | 6 | I(6) | I(4) + I(5) |
| 7 | 7 | I(7) | I(6) + I(7) |
| 8 | 0 | I(8) | I(0) − I(1) |
| 9 | 1 | I(9) | I(2) − I(3) |
| 10 | 2 | I(10) | I(4) − I(5) |
| 11 | 3 | I(11) | I(6) − I(7) |
| 12 | 4 | I(12) | I(8) + I(9) |
| 13 | 5 | I(13) | I(10) + I(11) |
| 14 | 6 | I(14) | I(12) + I(13) |
| 15 | 7 | I(15) | I(14) + I(15) |
| 16 | 0 | | I(8) − I(9) |
| 17 | 1 | | I(10) − I(11) |
| 18 | 2 | | I(12) − I(13) |

TABLE 7-continued

| i | i mod N | I(i) | O(i) |
|---|---------|------|------|
| 19 | 3 | | I(14) − I(15) |

When N=8, Pipelined Fast Hadamard Transform 302 has $\log_2 N=3$ stages: stage 2, stage 1 and stage 0. Table 8 depicts the relationship of i, I(i) on lead 301 and O(i) for each of the three stages. O(i) for stage 0 is output on lead 303.

TABLE 8

| i | i mod N (N = 8) | Input to Stage 2 (lead 301) | Output of Stage 2 = Input of Stage 1 | Output of Stage 1 = Input of Stage 0 | Output of Stage 0 (lead 303) |
|---|---|---|---|---|---|
| 0 | 0 | I(0) | | | |
| 1 | 1 | I(1) | | | |
| 2 | 2 | I(2) | | | |
| 3 | 3 | I(3) | | | |
| 4 | 4 | I(4) | I(0) + I(1) | | |
| 5 | 5 | I(5) | I(2) + I(3) | | |
| 6 | 6 | I(6) | I(4) + I(5) | | |
| 7 | 7 | I(7) | I(6) + I(7) | | |
| 8 | 0 | | I(0) − I(1) | I(4) + I(5) | |
| 9 | 1 | | I(2) − I(3) | I(6) + I(7) | |
| 10 | 2 | | I(4) − I(5) | I(8) + I(9) | |
| 11 | 3 | | I(6) − I(7) | I(10) + I(11) | |
| 12 | 4 | | | I(4) − I(5) | I(8) + I(9) |
| 13 | 5 | | | I(6) − I(7) | I(10) + I(11) |
| 14 | 6 | | | I(8) − I(9) | I(12) + I(13) |
| 15 | 7 | | | I(10) − I(11) | I(14) + I(15) |
| 16 | 0 | | | | I(8) − I(9) |
| 17 | 1 | | | | I(10) − I(11) |
| 18 | 2 | | | | I(12) − I(13) |
| 19 | 3 | | | | I(14) − I(15) |

From Table 8 it can be seen that it takes 8 cycles to input the 8 Walsh chips of one codeword into stage 2 and 12 cycles before the first output emerges on lead 303. By i=19, all 8 correlation signals have emerged on lead 303. Although each stage is identical, the odd stages are adding coefficients while i mod $N \geq N/2$ and subtracting coefficients while i mod $N < N/2$. Similarly, the even stages are subtracting coefficients while i mod $N \geq N/2$ and adding coefficients while i mod $N < N/2$. Therefore, the transfer function for stage j is:

$$O(i) = \begin{cases} I(k - k\mathrm{mod}N + 2k\mathrm{mod}N) + (-1)^j * I(k - k\mathrm{mod}N + 2k\mathrm{mod}N + 1) & i\mathrm{mod}N \geq N/2 \\ I(k - k\mathrm{mod}N + 2k\mathrm{mod}N) - (-1)^j * I(k - k\mathrm{mod}N + 2k\mathrm{mod}N + 1) & i\mathrm{mod}N < N/2 \end{cases}$$

wherein i is a non-negative integer indicative of the pipeline cycle and k=(i-N/2). It will be clear to those skilled in the art that values for k<0 are undefined.

From Table 8, it can also be seen that at every multiple of i mod N=8, another set of N Walsh chips can be input into stage 2, the output of which begins to emerge on lead 303 12 cycles later. It will be clear to those skilled in the art how to make and use embodiments of the invention in which each stage accepts one input per pipeline cycle for other values of N and that the equations above entirely define the transfer function for each stage of Pipelined Fast Hadamard Transform 302.

In accordance with the first illustrative embodiment and Table 8, the illustrative set of 8 Walsh chips depicted in Table 9 generate, after 19 pipeline cycles, the 8 correlation signals depicted in Table 10, which is the identical result produced in the prior art as shown in Table 5.

TABLE 9

| Input on Lead 301 | |
|---|---|
| Input | Walsh chips |
| I(0) | +0.92 |
| I(1) | +1.04 |
| I(2) | +0.34 |
| I(3) | +0.56 |
| I(4) | −0.23 |
| I(5) | +0.35 |
| I(6) | +0.87 |
| I(7) | +0.71 |

TABLE 10

| Output on Lead 303 | | |
|---|---|---|
| Output | Codeword Index | Correlation Coefficient Signals |
| O(12) | 1 | 4.96 |
| O(13) | 2 | 1.56 |
| O(14) | 3 | 2.12 |
| O(15) | 4 | −0.80 |
| O(16) | 5 | −0.24 |
| O(17) | 6 | 1.24 |

TABLE 10-continued

| Output on Lead 303 | | |
|---|---|---|
| Output | Codeword Index | Correlation Coefficient Signals |
| O(18) | 7 | −0.32 |
| O(19) | 8 | −1.16 |

Figure 6:
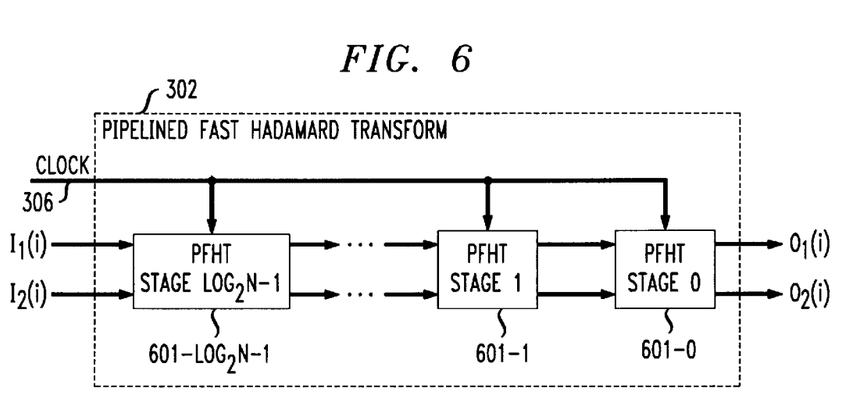
FIG. 6 depicts a block diagram of a Pipelined Fast Hadamard Transform in accordance with the second and third illustrative embodiments of the present invention.

FIG. 6 depicts a block diagram of a second illustrative embodiment of Pipelined Fast Hadamard Transform 302, which advantageously comprises $\log_2 N$ identical stages, PFHT stage 601-$\log_2 N$−1 through PFHT stage 601-0. The salient difference between the first illustrative embodiment in FIG. 4 and the second and third illustrative embodiments is that the latter accept two Walsh chips per pipeline cycle and output two correlation signals per pipeline cycle. The result is that the second and third illustrative embodiments each process N Walsh chips in one-half the number of pipeline cycles of the first illustrative embodiment, although all of the embodiments operate in real-time.

As in the first illustrative embodiment the stages are cascaded so that the input of stage j is the output of stage j+1 for j=0 to $\log_2 N$−1. And because the stages are identical, embodiments of the present invention are especially well-suited for implementation in application-specific integrated circuits.

Figure 7:
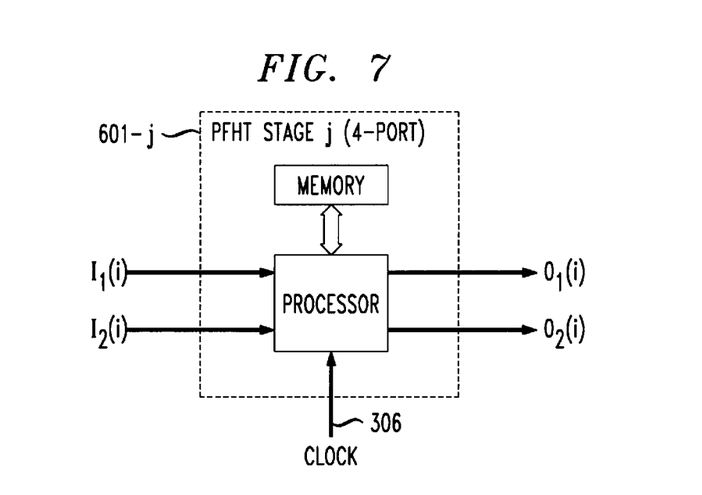
FIG. 7 depicts a block diagram of a 4-port Pipeline Fast Hadamard Transform stage in accordance with the second and third illustrative embodiments.

FIG. 7 depicts a block diagram of stage 601-$j$, which accepts two input signals and outputs two output signals per pipeline cycle. If stage 601-$j$ is the first stage, the input is Walsh chips. If stage 601-$j$ is not the first stage, the input is intermediate correlation signals that are based on the Walsh chips fed into the first stage. If stage 601-$j$ is the last stage, the output is the final correlation signals for decoder 304, and if stage 601-$j$ is not the last stage, the output is intermediate correlation signals for the next stage.

Stage 601-$j$ advantageously comprises a hard-wired special-purpose processor for generating the outputs O(i) and $O_2(i)$ based on the inputs $I_1(i)$ and $I_2(i)$, and a memory to store the respective signals pending their use and output. When one set of N Walsh chips is input to stage 501-$j$ in N/2 cycles, beginning at i mod N=0, the outputs $O_1(i)$ and $O_2(i)$ are related to the inputs $I_1(i)$ and $I_2(i)$ by the transfer functions:

$$O_1(i) = \begin{cases} I_1(k - k\mathrm{mod}N + 2k\mathrm{mod}N) + I_2(k - k\mathrm{mod}N + 2k\mathrm{mod}N) & i\mathrm{mod}N \geq N/2 \\ I_1(k - k\mathrm{mod}N + 2k\mathrm{mod}N) - I_2(k - k\mathrm{mod}N + 2k\mathrm{mod}N) & i\mathrm{mod}N < N/2 \end{cases}$$

$$O_2(i) = \begin{cases} I_1(k - k\mathrm{mod}N + 2k\mathrm{mod}N + 1) + I_2(k - k\mathrm{mod}N + 2k\mathrm{mod}N + 1) & i\mathrm{mod}N \geq N/2 \\ I_1(k - k\mathrm{mod}N + 2k\mathrm{mod}N + 1) - I_2(k - k\mathrm{mod}N + 2k\mathrm{mod}N + 1) & i\mathrm{mod}N < N/2 \end{cases}$$

wherein i is a non-negative integer indicative of the pipeline cycle and k=(i-N/2). It will be clear to those skilled in the art that values for k<0 are undefined.

In Table 11, below, it can be seen that it takes 2 cycles to input 4 Walsh chips and 3 cycles to output 4 intermediate correlation signals through stage 601-j, for Walsh codewords comprising $2^n=4$ chips.

TABLE 11

| i | i mod N | $I_1(i)$ | $I_2(i)$ | $O_1(i)$ | $O_2(I)$ |
|---|---------|----------|----------|----------|----------|
| 0 | 0 | $I_1(0)$ | $I_2(0)$ | | |
| 1 | 1 | $I_1(1)$ | $I_2(1)$ | $I_1(0) + I_2(0)$ | $I_1(1) + I_2(1)$ |
| 2 | 2 | | | $I_1(0) - I_2(0)$ | $I_1(1) - I_2(1)$ |

In Table 12, below, it can be seen that it takes 2 cycles to input 4 Walsh chips and 4 cycles to output 4 final correlation signals through PFHT 302 as depicted in FIG. 6.

TABLE 12

| i | i mod N | Input to Stage 1 $I_1(i)$ | Input to Stage 1 $I_2(i)$ | Output of Stage 2 ($O_1(i)$) = Input of Stage 0 | Output of Stage 2 ($O_2(I)$) = Input of Stage 0 | Output of Stage 0 $O_1(i)$ | Output of Stage 0 $O_2(I)$ |
|---|---------|----------|----------|----------|----------|----------|----------|
| 0 | 0 | $I_1(0)$ | $I_2(0)$ | | | | |
| 1 | 1 | $I_1(1)$ | $I_2(1)$ | $I_1(0) + I_2(0)$ | $I_1(1) + I_2(1)$ | | |
| 2 | 2 | | | $I_1(0) - I_2(0)$ | $I_1(1) - I_2(1)$ | $I_1(1) - I_2(1)$ | $I_1(2) - I_2(2)$ |
| 3 | 3 | | | | | $I_1(1) + I_2(1)$ | $I_1(2) + I_2(2)$ |

Although each stage is identical, the even stages are adding coefficients while i mod $N \geq N/2$ and subtracting coefficients while i mod $N \geq N/2$. Similarly, the even stages are subtracting coefficients while i mod $N \geq N/2$ and adding coefficients while i mod $N < N/2$. Therefore, the transfer function for stage j in accordance with the second illustrative embodiment is:

$$O_1(i) = \begin{cases} I_1(k - k\bmod N + 2k\bmod N) + (-1)^j * I_2(k - k\bmod N + 2k\bmod N) & i\bmod N \geq N/2 \\ I_1(k - k\bmod N + 2k\bmod N) - (-1)^j * I_2(k - k\bmod N + 2k\bmod N) & i\bmod N < N/2 \end{cases};$$

and $$O_2(i) = \begin{cases} I_1(k - k\bmod N + 2k\bmod N + 1) + (-1)^j * I_2(k - k\bmod N + 2k\bmod N + 1) & i\bmod N \geq N/2 \\ I_1(k - k\bmod N + 2k\bmod N + 1) - (-1)^j * I_2(k - k\bmod N + 2k\bmod N + 1) & i\bmod N < N/2 \end{cases}$$

wherein i is a non-negative integer indicative of the pipeline cycle and k=(i-N/2). It will be clear to those skilled in the art that values of k<0 are not defined.

The third illustrative embodiment of the present invention uses the same architecture depicted in FIGS. 5 and 6 except that each stage employs a different transfer function and that whereas each stage in the second illustrative embodiment requires the same amount of memory, each stage in the third illustrative embodiment requires one-half of the memory than the next upstream stage. Therefore, the third illustrative embodiment is particularly well-suited for applications in which the number of gates in the embodiment must be kept low.

When one set of N Walsh chips is input to stage j in N/2 cycles, beginning with cycle i mod N=0, the outputs $O_1(i)$ and $O_2(i)$ are related to the inputs $I_1(i)$ and $I_2(i)$ by the transfer functions:

For Stage $\log_2 N - 1$:

$$O_1(i) = \begin{cases} I_1(A) + I_2(A) & b_{j-1} = 1 \\ I_1(A) - I_2(A) & b_{j-1} = 0 \end{cases}; \text{and}$$

$$O_2(i) = \begin{cases} I_1(A+1) + I_2(A+1) & b_{j-1} = 1 \\ I_1(A+1) - I_2(A+1) & b_{j-1} = 0 \end{cases};$$

wherein $A = \left[ \overline{(b_j \oplus b_{j-1})} 2^{j-1} + \sum_{k=0}^{j-2} b_k 2^k \right] * 2$, $b_{-1} = 0$ and $i\bmod N = \sum_{k=0}^{\log_2 N - 1} b_k 2^k$.

For Stages $\log_2 N - 1 < j < 0$:

$$O_1(i) = \begin{cases} I_1(A) + I_2(A) & b_j = 1 \\ I_1(A) - I_2(A) & b_j = 0 \end{cases}; \text{and}$$

$$O_2(i) = \begin{cases} I_1(A+1) + I_2(A+1) & b_j = 1 \\ I_1(A+1) - I_2(A+1) & b_j = 0 \end{cases};$$

wherein $A = \left[ \overline{(b_j \oplus b_{j-1})} 2^{j-1} + \sum_{k=0}^{j-2} b_k 2^k \right] * 2$, $b_{-1} = 0$ and $i\bmod N = \sum_{k=0}^{\log_2 N - 1} b_k 2^k$.

For Stage $j = 0$:

$$O_1(i) = \begin{cases} I_1(A) - I_2(A) & b_j = 1 \\ I_1(A) + I_2(A) & b_j = 0 \end{cases}; \text{and}$$

$$O_2(i) = \begin{cases} I_1(A+1) - I_2(A+1) & b_j = 1 \\ I_1(A+1) + I_2(A+1) & b_j = 0 \end{cases};$$

-continued wherein $A = \overline{b_0}$, $b_{-1} 0$ and $i\bmod N = \sum_{k=0}^{\log_2 N - 1} b_k 2^k$.

It will be clear to those skilled in the art that $b_k$ is defined by i mod N, as described above, and that j is indicative of the stage. It will be clear to those skilled in the art that the above equations fully define the transfer function for the third illustrative embodiment.

Figure 8:
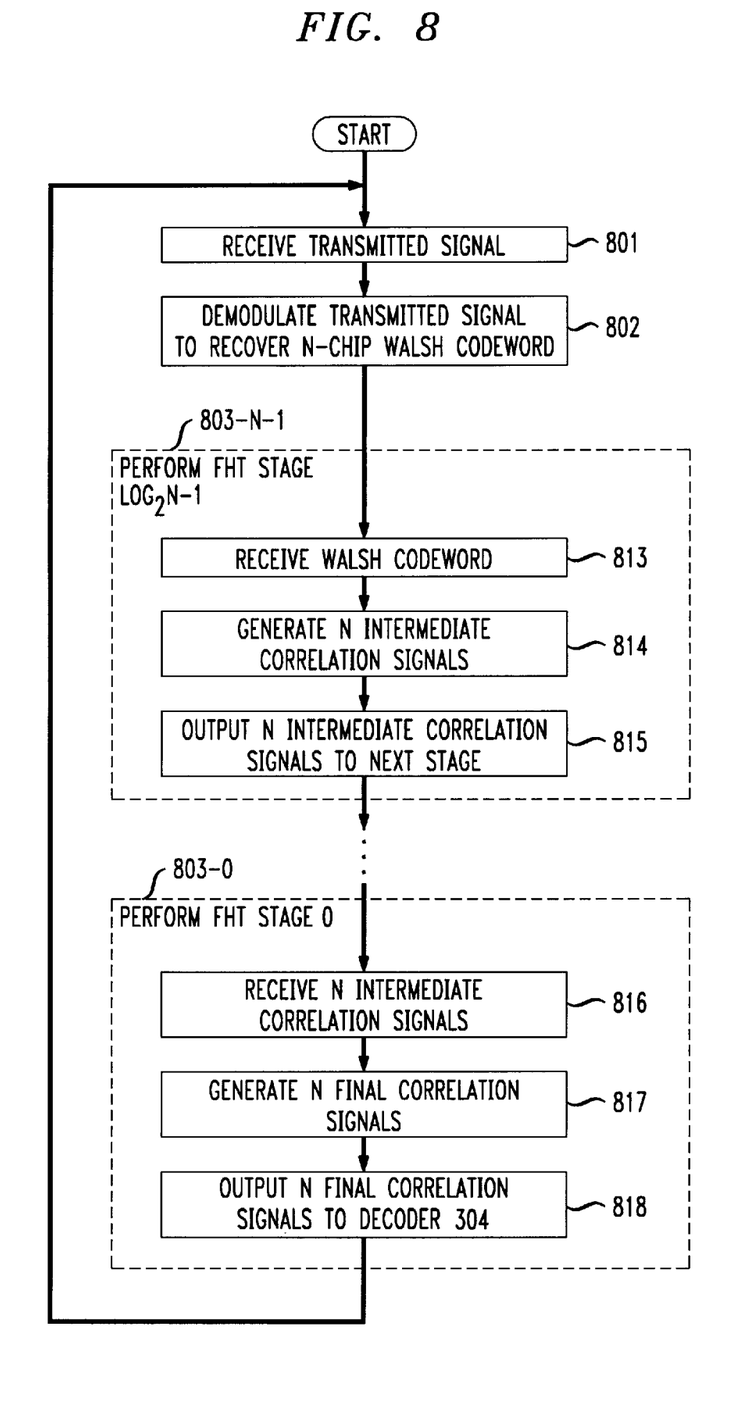
FIG. 8 depicts a flowchart of the operation of the illustrative embodiments of the present invention.

FIG. 8 depicts a flowchart that illustrates the methodology performed by the illustrative embodiments of the present invention.

At step 801, the illustrative embodiment receives a transmitted signal from a remote transmitter, which transmitted signal has been encoded with an N-chip Walsh code in well-known fashion.

At step 802, the illustrative embodiment demodulates the transmitted signal, in well-known fashion, to recover an estimate of the transmitted N-chip Walsh codeword, which has been potentially corrupted by noise, interference, and distortion.

At step 803-N, the first stage, stage log$_2$N−1, of Pipelined Fast Hadamard Transform 302 receives the estimate of the N-chip Walsh codeword and begins the process of generating the N correlation signals. At step 813, the N Walsh chips are sequentially received by stage log$_2$N−1 and at step 814, the first set of N intermediate correlation coefficients is generated, in accordance with one of the transfer functions described above. At step 815 the N intermediate correlation coefficients are output, sequentially, to the next stage.

Steps 803-N−2 through 803-1 are advantageously identical to step 803-N−1, with the number of stages in the illustrative embodiment equal to log$_2$N.

At step 803-0, the illustrative embodiment advantageously performs stage 0 of the Pipelined Fast Hadamard Transform. At step 816, the illustrative embodiment receives N intermediate correlation signals, sequentially, from stage 1, and at step 817, the illustrative embodiment advantageously generates the N final correlation signals. At step 818, the N final correlation coefficients are output sequentially, and control returns to step 801.

It is to be understood that the above-described embodiments are merely illustrative of the invention and that many variations may be devised by those skilled in the art without departing from the scope of the invention. It is therefore intended that such variations be included within the scope of the following claims.

What is claimed is:

1. A stage in a channel decoder comprising:

a first input for sequentially receiving N incoming correlation signals, I(i), at cycle i, wherein said N incoming correlation signals are based on N Walsh chips;

a processor for generating N outgoing correlation signals based on said N incoming correlation signals, I(i); and a first output for sequentially outputting said N outgoing correlation signals, O(i);

wherein $$O(i) = \begin{cases} I(k - k\bmod N + 2k\bmod N) + I(k - k\bmod N + 2k\bmod N + 1) \\ \qquad i\bmod N \geq N/2 \\ I(k - k\bmod N + 2k\bmod N) - I(k - k\bmod N + 2k\bmod N + 1) \\ \qquad i\bmod N < N/2 \end{cases}, \text{ and}$$

k=(i-N/2).

2. A method for processing correlation signals in a channel decoder, said method comprising:

sequentially receiving N incoming correlation signals, I(i), at cycle i, wherein said N incoming correlation signals are based on N Walsh chips;

generating N outgoing correlation signals based on said N incoming correlation signals, I(i); and sequentially outputting said N outgoing correlation signals, O(i);

wherein $$O(i) = \begin{cases} I(k - k\bmod N + 2k\bmod N) + I(k - k\bmod N + 2k\bmod N + 1) \\ \qquad i\bmod N \geq N/2 \\ I(k - k\bmod N + 2k\bmod N) - I(k - k\bmod N + 2k\bmod N + 1) \\ \qquad i\bmod N < N/2 \end{cases}, \text{ and}$$

k=(i-N/2).

3. A channel decoder comprising:

log$_2$N stages, numbered log$_2$N−1 through 0, that are cascaded so that the input of stage j is the output of stage j+1, wherein each stage comprises:

a first input for sequentially receiving N incoming correlation signals, I(i), at cycle i, wherein said N incoming correlation signals are based on N Walsh chips;

a processor for generating N outgoing correlation signals based on said N incoming correlation signals; I(i); and a first output for sequentially outputting said N outgoing correlation signals, O(i);

wherein $$O(i) = \begin{cases} I(k - k\bmod N + 2k\bmod N) + (-1)^j * I(k - k\bmod N + 2k\bmod N + 1) & i\bmod N \geq N/2 \\ I(k - k\bmod N + 2k\bmod N) - (-1)^j * I(k - k\bmod N + 2k\bmod N + 1) & i\bmod N < N/2 \end{cases},$$

and k=(i-N/2).

4. A stage in a channel decoder comprising:

a first input for sequentially receiving N/2 incoming correlation signals, I$_1$(i), at cycle i, wherein said N/2 incoming correlation signals are based on N/2 Walsh chips;

a second input for sequentially receiving N/2 incoming correlation signals, I$_2$(i), wherein said N/2 incoming correlation signals are based on N/2 Walsh chips;

a processor for generating N/2 outgoing correlation signals, O$_1$(i), and N/2 outgoing correlation signals, O$_2$(i), based on said incoming correlation signals I$_1$(i) and I$_2$(i);

a first output for outputting said N/2 outgoing correlation signals, O$_1$(i), wherein $$O_1(i) = \begin{cases} I_1(k - k\mathrm{mod}N + 2k\mathrm{mod}N) + I_2(k - k\mathrm{mod}N + 2k\mathrm{mod}N) & i\mathrm{mod}N \geq N/2 \\ I_1(k - k\mathrm{mod}N + 2k\mathrm{mod}N) - I_2(k - k\mathrm{mod}N + 2k\mathrm{mod}N) & i\mathrm{mod}N < N/2 \end{cases}; \text{and}$$

a second output for outputting said N/2 outgoing correlation signals, $O_2(i)$, wherein $$O_2(i) = \begin{cases} I_1(k - k\mathrm{mod}N + 2k\mathrm{mod}N + 1) + I_2(k - k\mathrm{mod}N + 2k\mathrm{mod}N + 1) & i\mathrm{mod}N \geq N/2 \\ I_1(k - k\mathrm{mod}N + 2k\mathrm{mod}N + 1) - I_2(k - k\mathrm{mod}N + 2k\mathrm{mod}N + 1) & i\mathrm{mod}N < N/2 \end{cases}, \text{and}$$

k=(i-N/2).

5. A method for processing correlation signals in a channel decoder, said method comprising:

sequentially receiving N/2 incoming correlation signals, $I_1(i)$, at cycle i, wherein said N/2 incoming correlation signals are based on N/2 Walsh chips;

sequentially receiving N/2 incoming correlation signals, $I_2(i)$, wherein said N/2 incoming correlation signals are based on N/2 Walsh chips;

generating N/2 outgoing correlation signals, $O_1(i)$, and N/2 outgoing correlation signals, $O_2(i)$, based on said incoming correlation signals $I_1(i)$ and $I_2(i)$;

outputting said N/2 outgoing correlation signals, $O_1(i)$, wherein $$O_1(i) = \begin{cases} I_1(k - k\mathrm{mod}N + 2k\mathrm{mod}N) + I_2(k - k\mathrm{mod}N + 2k\mathrm{mod}N) & i\mathrm{mod}N \geq N/2 \\ I_1(k - k\mathrm{mod}N + 2k\mathrm{mod}N) - I_2(k - k\mathrm{mod}N + 2k\mathrm{mod}N) & i\mathrm{mod}N < N/2 \end{cases}; \text{and}$$

outputting said N/2 outgoing correlation signals, $O_2(i)$, wherein $$O_2(i) = \begin{cases} I_1(k - k\mathrm{mod}N + 2k\mathrm{mod}N + 1) + I_2(k - k\mathrm{mod}N + 2k\mathrm{mod}N + 1) & i\mathrm{mod}N \geq N/2 \\ I_1(k - k\mathrm{mod}N + 2k\mathrm{mod}N + 1) - I_2(k - k\mathrm{mod}N + 2k\mathrm{mod}N + 1) & i\mathrm{mod}N < N/2 \end{cases},$$

wherein k=(i-N/2).

6. A channel decoder comprising:

$\log_2 N$ stages, numbered $\log_2 N-1$ through 0, that are cascaded so that the input of stage j is the output of stage j+1, wherein each stage comprises:

a first input for sequentially receiving N/2 incoming correlation signals, $I_1(i)$, at cycle i, wherein said N/2 incoming correlation signals are based on N/2 Walsh chips;

a second input for sequentially receiving N/2 incoming correlation signals, $I_2(i)$, wherein said N/2 incoming correlation signals are based on N/2 Walsh chips;

a processor for generating N/2 outgoing correlation signals, $O_1(i)$, and N/2 outgoing correlation signals, $O_2(i)$, based on said incoming correlation signals $I_1(i)$ and $I_2(i)$;

a first output for outputting said N/2 outgoing correlation signals, $O_1(i)$, wherein $$O_1(i) = \begin{cases} I_1(k - k\mathrm{mod}N + 2k\mathrm{mod}N) + (-1)^j * I_2(k - k\mathrm{mod}N + 2k\mathrm{mod}N) & i\mathrm{mod}N \geq N/2 \\ I_1(k - k\mathrm{mod}N + 2k\mathrm{mod}N) - (-1)^j * I_2(k - k\mathrm{mod}N + 2k\mathrm{mod}N) & i\mathrm{mod}N < N/2 \end{cases}; \text{and}$$

a second output for outputting said N/2 outgoing correlation signals, $O_2(i)$, wherein $$O_2(i) = \begin{cases} I_1(k - k\mathrm{mod}N + 2k\mathrm{mod}N + 1) + (-1)^j * I_2(k - k\mathrm{mod}N + 2k\mathrm{mod}N + 1) & i\mathrm{mod}N \geq N/2 \\ I_1(k - k\mathrm{mod}N + 2k\mathrm{mod}N + 1) - (-1)^j * I_2(k - k\mathrm{mod}N + 2k\mathrm{mod}N + 1) & i\mathrm{mod}N < N/2 \end{cases}$$

and k=(i-N/2).

7. A channel decoder comprising:

$\log_2 N$ stages, numbered $\log_2 N-1$ through 0, that are cascaded so that the input of stage j is the output of stage j+1, wherein each stage comprises:

a first input for sequentially receiving N/2 incoming correlation signals, $I_1(i)$, at cycle i, wherein said N/2 incoming correlation signals are based on N/2 Walsh chips;

a second input for sequentially receiving N/2 incoming correlation signals, $I_2(i)$, wherein said N/2 incoming correlation signals are based on N/2 Walsh chips;

a processor for generating N/2 outgoing correlation signals, $O_1(i)$, and N/2 outgoing correlation signals, $O_2(i)$, based on said incoming correlation signals $I_1(i)$ and $I_2(i)$;

a first output for outputting said N/2 outgoing correlation signals, $O_1(i)$; and a second output for outputting said N/2 outgoing correlation signals, $O_2(i)$;

wherein the transfer function for stage j is:

for stage $j = \log_2 N - 1$:

$$O_1(i) = \begin{cases} I_1(A) + I_2(A) & b_{j-1} = 1 \\ I_1(A) - I_2(A) & b_{j-1} = 0 \end{cases} ; \text{and}$$

$$O_2(i) = \begin{cases} I_1(A+1) + I_2(A+1) & b_{j-1} = 1 \\ I_1(A+1) - I_2(A+1) & b_{j-1} = 0 \end{cases};$$

wherein $A = \left[ \overline{(b_j \oplus b_{j-1})} 2^{j-1} + \sum_{k=0}^{j-2} b_k 2^k \right] * 2$, $b_{-1} = 0$, and $i \bmod N = \sum_{k=0}^{\log_2 N - 1} b_k 2^k$;

for stages $\log_2 N - 1 < j < 0$:

$$O_1(i) = \begin{cases} I_1(A) + I_2(A) & b_j = 1 \\ I_1(A) - I_2(A) & b_j = 0 \end{cases} ; \text{and}$$

$$O_2(i) = \begin{cases} I_1(A+1) + I_2(A+1) & b_j = 1 \\ I_1(A+1) - I_2(A+1) & b_j = 0 \end{cases};$$

wherein $A = \left[ \overline{(b_j \oplus b_{j-1})} 2^{j-1} + \sum_{k=0}^{j-2} b_k 2^k \right] * 2$, $b_{-1} = 0$, and $i \bmod N = \sum_{k=0}^{\log_2 N - 1} b_k 2^k$; and for stage $j = 0$:

$$O_1(i) = \begin{cases} I_1(A) - I_2(A) & b_j = 1 \\ I_1(A) + I_2(A) & b_j = 0 \end{cases} ; \text{and}$$

$$O_2(i) = \begin{cases} I_1(A+1) - I_2(A+1) & b_j = 1 \\ I_1(A+1) + I_2(A+1) & b_j = 0 \end{cases};$$

wherein $A = \overline{b_0}$, $b_{-1} 0$, and $i \bmod N = \sum_{k=0}^{\log_2 N - 1} b_k 2^k$.

\* \* \* \* \*